April 18, 1950
J. DALLAS
2,504,655
METHOD AND APPARATUS FOR CUTTING AND BREAKING SHEET GLASS
Filed Feb. 6, 1947
5 Sheets-Sheet 1
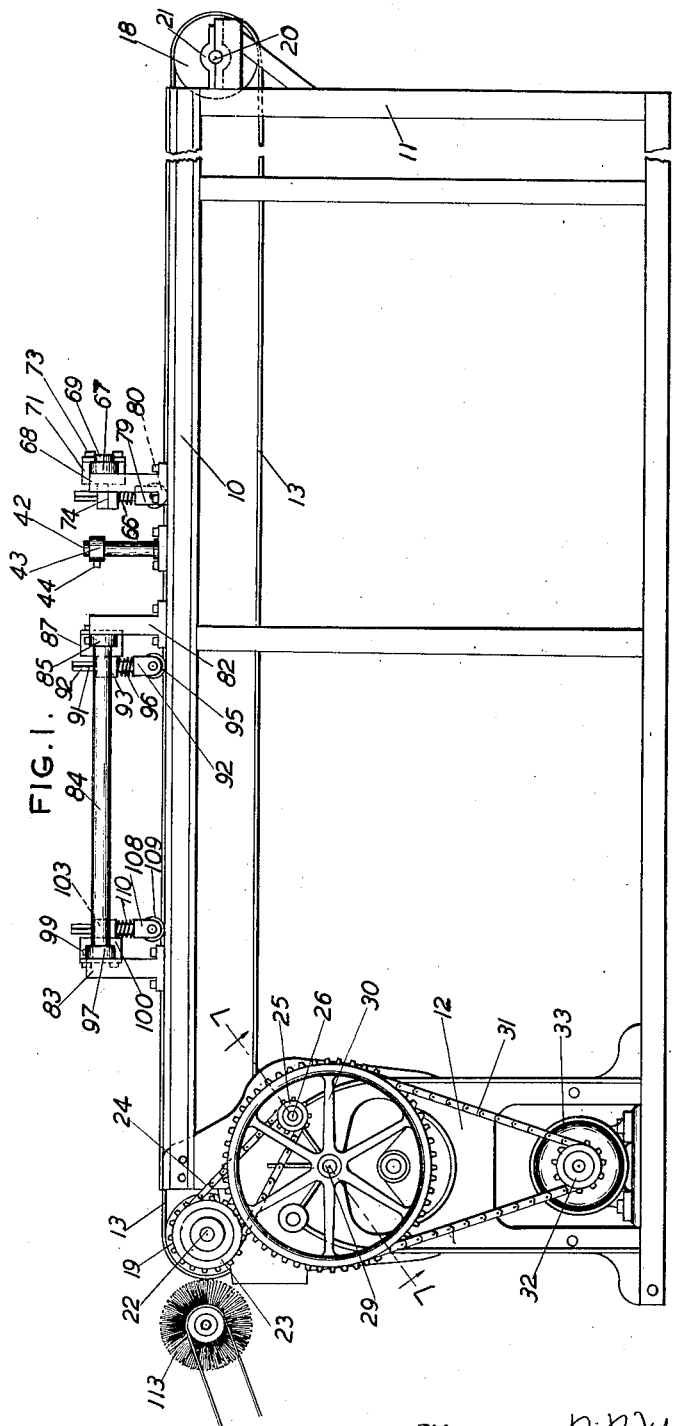
INVENTOR
JOHN DALLAS
BY
ATTORNEY

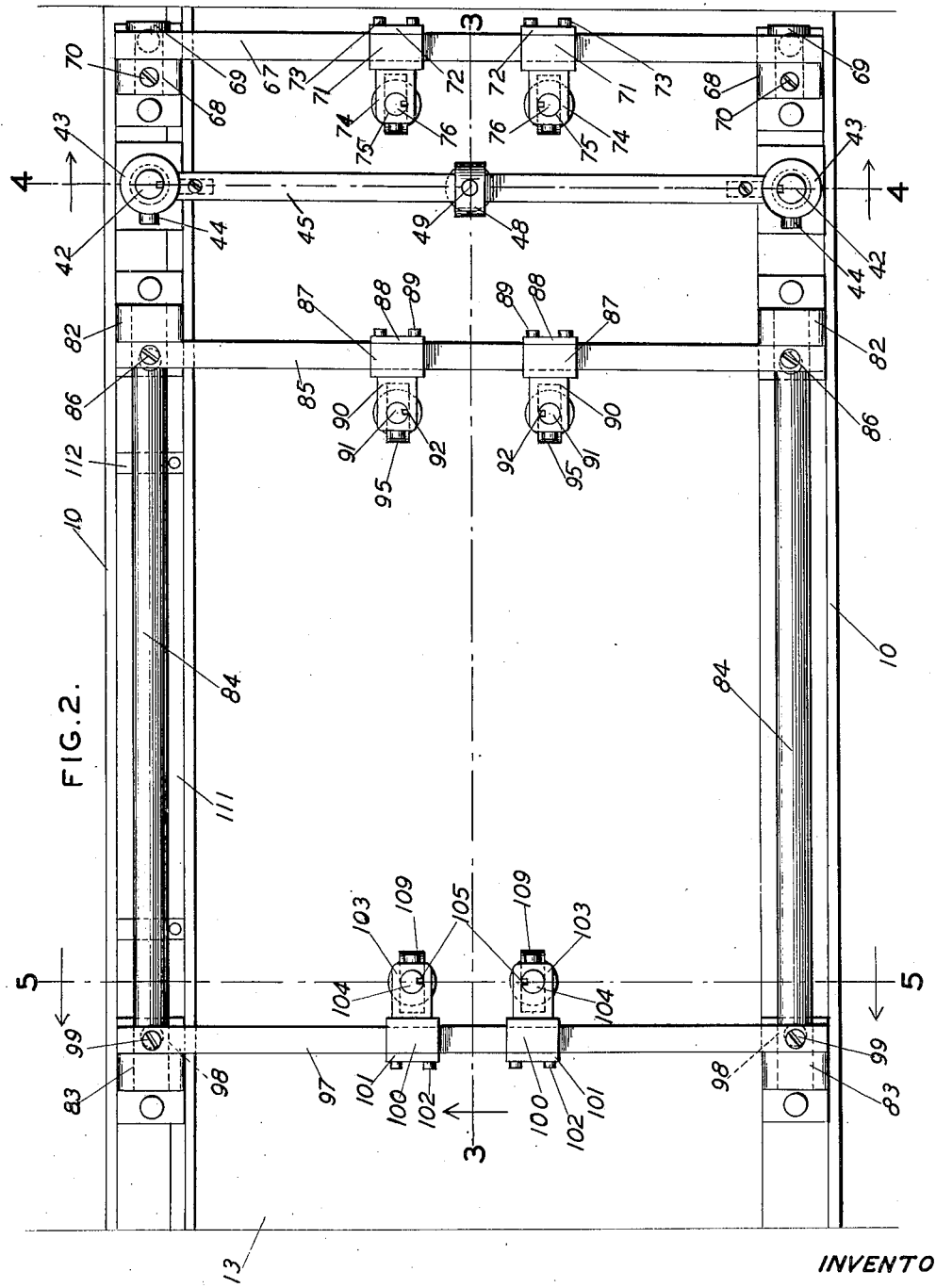

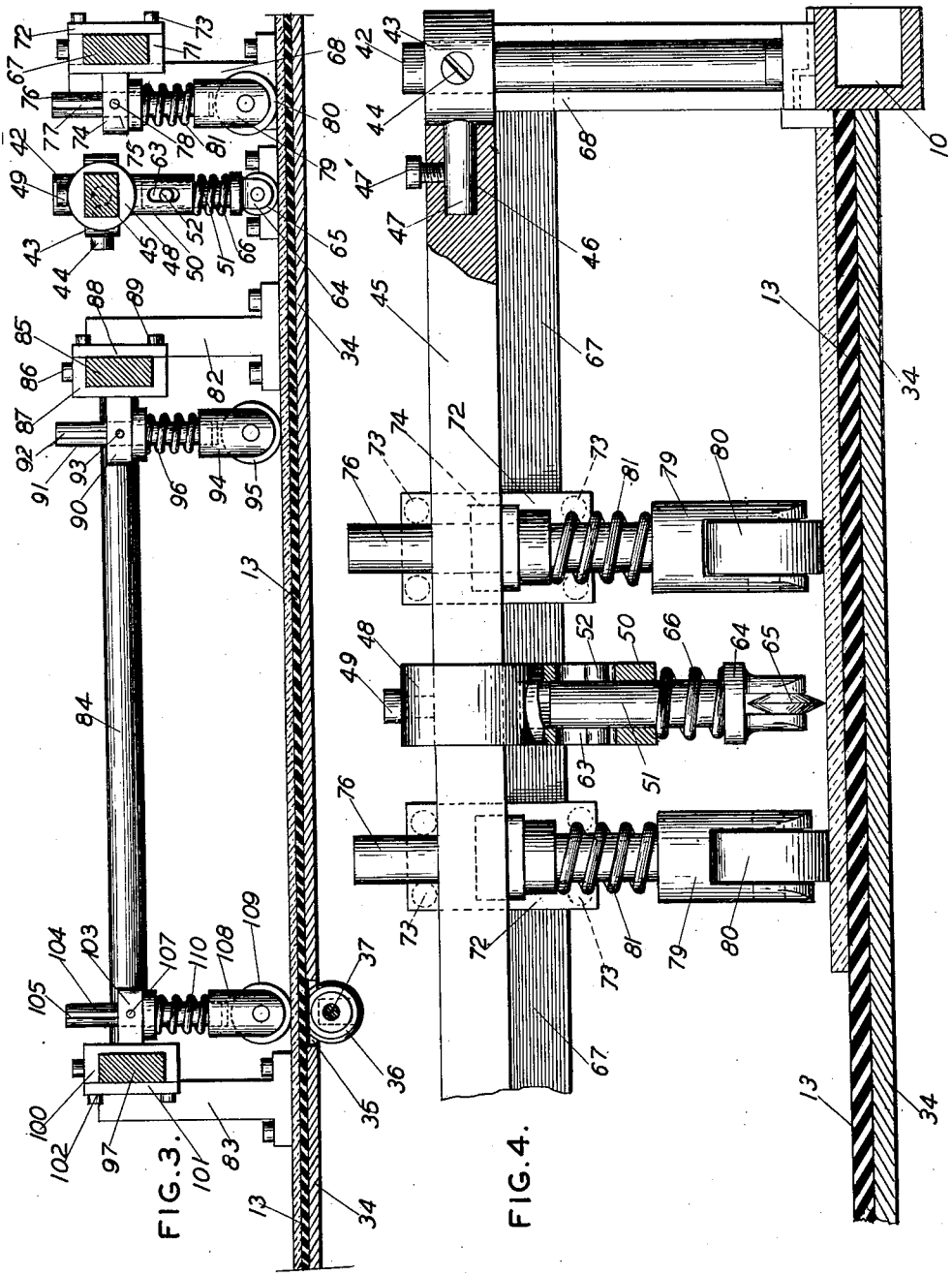

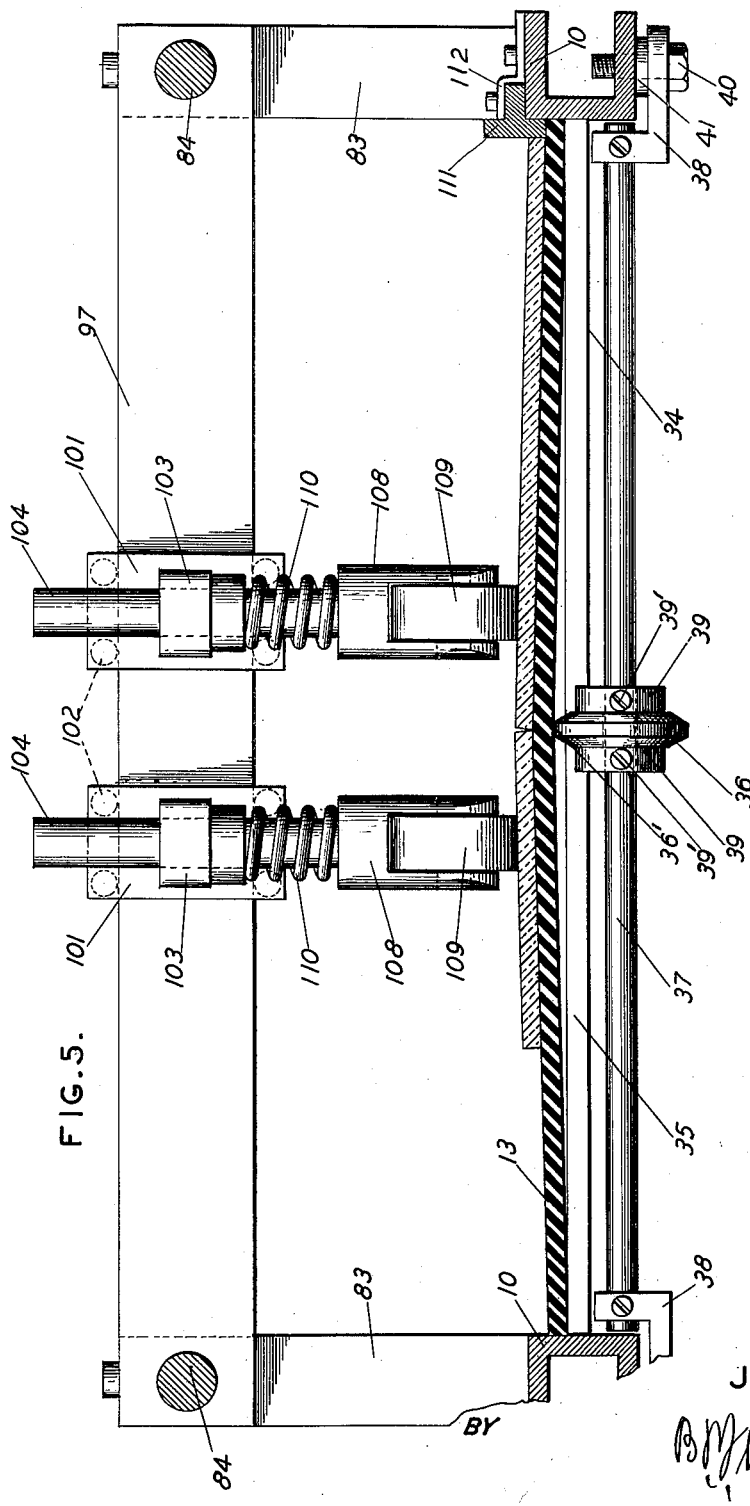

April 18, 1950
J. DALLAS
2,504,655
METHOD AND APPARATUS FOR CUTTING
AND BREAKING SHEET GLASS
Filed Feb. 6, 1947
5 Sheets-Sheet 5
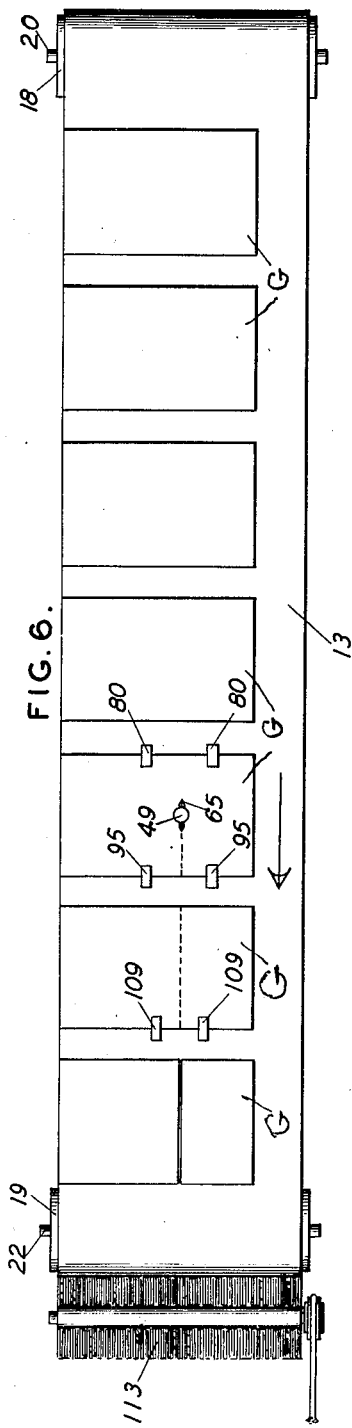
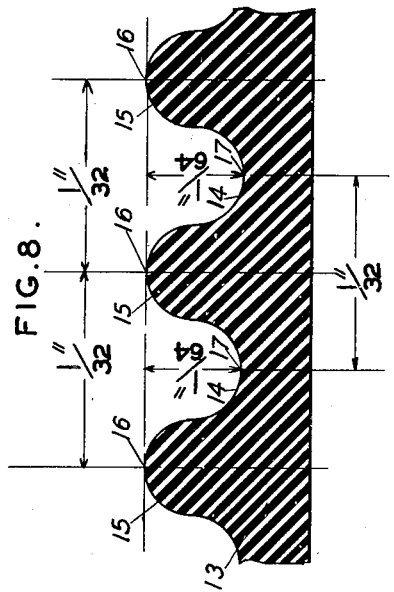
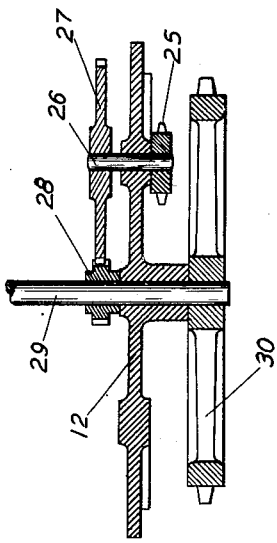
Inventor
JOHN DALLAS
By
Attorney Patented Apr. 18, 1950

2,504,655

UNITED STATES PATENT OFFICE 2,504,655

METHOD OF AND APPARATUS FOR CUTTING AND BREAKING SHEET GLASS

John Dallas, Wheeling, W. Va.

Application February 6, 1947, Serial No. 726,754

11 Claims. (Cl. 49—48)

My invention relates to a method of and apparatus for cutting and breaking sheet glass, such as plate, window, or other glass.

An important object of the invention is to provide a method which continuously advances the glass for the cutting and breaking steps.

A further object of the invention is to provide an apparatus to be employed in the practice of the method.

A further object of the invention is to provide an apparatus having a traveling belt so constructed that the sheet of glass applied thereto will not slip or creep upon the belt during the cutting or breaking operations.

A further object of the invention is to provide a method of the above mentioned character whereby the sheet of glass may be cut and broken rapidly.

In the accompanying drawings forming a part of this application, and in which like numerals are employed to designate like parts throughout the same, Figure 1 is a side elevation of apparatus embodying my invention, Figure 2 is a plan view of the machine, parts cut away, Figure 3 is a longitudinal section taken on line 3—3 of Figure 2, Figure 4 is a transverse vertical section taken on line 4—4 of Figure 3, parts broken away, Figure 5 is a transverse vertical section taken on line 5—5 of Figure 2, Figure 6 is a plan view of the machine, partly diagrammatic, Figure 7 is a transverse section through the gearing taken on line 7—7 of Figure 1, and Figure 8 is an enlarged transverse section through the belt, showing the longitudinal ribs and taken on line 5—5 of Figure 2.

The machine comprises a horizontal frame including sides 10. This frame may be about thirteen feet long and about thirty inches wide, although the invention is not restricted to these dimensions. Corresponding ends of the frame sides 10 are supported by uprights 11 and their opposite ends are supported by uprights 12. Arranged within the horizontal frame is a flexible endless belt 13 and this belt is about twenty-eight inches wide and is slightly longer than the horizontal frame. The belt is formed of rubber with a fabric reinforcing. The rubber of the belt is resilient and compressible and has the degree of compressibility found in the tread of an ordinary pneumatic tire, although this may vary. The outer face of the belt is provided with fine longitudinal grooves 14 and ribs 15. The ribs 15 are substantially one thirty-second ($\frac{1}{32}$) of an inch from center to center at the high points 16, and are substantialy one thirty-second ($\frac{1}{32}$) of an inch from center to center at the low points 17. The grooves 14 and ribs 15 have a depth of substantially one-sixty-fourth ($\frac{1}{64}$) of an inch. When the glass G is pressed against the belt by the rollers it is found that the glass is locked to the belt so that it will not slip or creep thereon. The exact cause for this action is not known although it may be due somewhat to the fact that the grooves and ribs provide ventilation which prevents the formation of moisture upon the face of the glass sheet next to the rubber belt. Further, the end edges of the glass sheet under pressure sink into the belt and close the grooves beneath the glass sheet at the ends of the glass sheet, forming minute suction cups.

The endless belt 13 passes about horizontal rolls 18 and 19, at the ends of the frame sides 10. The roll 18 is carried by a transverse shaft 20, journaled in bearings 21. The roll 19 is mounted upon a shaft 22, journaled in suitable fixed bearings and the shaft 22 is driven by a sprocket wheel 23, rigidly mounted thereon. This sprocket wheel is engaged by a sprocket chain 24, engaging a smaller sprocket wheel 25, rigidly mounted upon a rotatable shaft 26. A large gear 27 is rigidly mounted upon the shaft 26 and engages a small gear 28, rigidly mounted upon a horizontal shaft 29, journaled in a suitable bearing carried by one upright 12. The gears 27 and 28 are upon the inner side of the upright 12, while a large sprocket wheel 30 is rigidly mounted upon the shaft 29, upon the outer side of the upright 12. The large sprocket wheel 30 is driven by a sprocket chain 31, engaging a small sprocket wheel 32, driven by a motor 33. The upper run of the belt 13 is driven at about fifty feet per minute although this speed may vary, up or down, depending upon the type of glass being cut.

Arranged between and rigidly secured to the frame sides 10 is a rigid horizontal table top 34, extending throughout substantially the entire length of the upper run of the belt 13. The upper run of the belt travels over the stationary top 34 and is supported thereby. The table top 34 has a transverse slot 35 extending throughout its entire width and this slot is arranged to receive a lower breaking roller 36. The breaking roller 36 has its periphery tapered at an angle of 45°, forming a cylindrical high portion 36' having a narrow length of substantially one-sixteenth ($\frac{1}{16}$) of an inch. The periphery of the roller 36 projects a slight distance beyond the upper face of the table top 34 such as one-eighth (⅛) of an inch. The breaking roller 36 is rotatably mounted upon a horizontal transverse shaft 37, disposed beneath the table top 34 and rigidly secured to brackets 38. The roller 36 is rotatable upon the shaft 37, as stated, and is arranged between collars 39, longitudinally adjustable upon the shaft 37 and clamped thereto by set screws 39. The roller 36 is thereby longitudinally adjustable upon the shaft 37. Each bracket 38 is secured to the frame side 10 by a vertical bolt 40, having shims 41. By manipulation of bolts and shims 41 the roller 36 is vertically adjusted. Any other suitable means may be employed to vertically adjust the roller 36. The brackets 38 may be separated from the frame sides 10 so that the shaft 37 can be separated from the roller 36. The breaking roll 36 may thus be mounted upon or removed from the shaft 37. Instead of applying one roller 36 to the shaft 37 a plurality of such rollers may be applied to the shaft.

Rigidly secured to the frame sides 10 are vertical posts 42, receiving vertically adjustable collars 43, clamped in place by set screws 44. Arranged between the collars 43 is a horizontal transverse bar 45, which is substantially square in cross section. The bar 45 is provided at its opposite ends with cylindrical openings 46 pivotally receiving horizontal trunnions 47, rigidly secured to the collars 43. The bar 45 carries set screws 47' for clamping engagement with the trunnions 47. It is thus seen that the bar 45 is vertically adjustable upon the posts 42 and may also be turned upon its longitudinal axis, and locked in the selected adjusted position. Slidably mounted upon the bar 45 is a collar 48, which cannot turn thereon. This collar 48 is clamped to the bar 45 by a set screw 49. Formed integral with the collar 48 and depending therefrom is a sleeve 50, having a cylindrical bore for receiving a cylindrical shank 51. This shank carries a radial horizontal pin 52, slidable within longitudinal slots 63, formed in the sleeve 50. This pin prevents the shank from turning upon its longitudinal axis with respect to the sleeve 50 and also limits the downward movement of the shank. Rigidly secured to the lower end of the shank 51 is a forked head 64, carrying a rotatable glass cutter 65 of any well known or preferred type. A diamond may be substituted for the rotatable cutter 65, if desired. Surrounding the shank 51 is a coil spring 66, arranged between the end of the sleeve 50 and the head 64. The tension of the spring 66 is regulated by vertically adjusting the collars 43, depending upon the thickness of the glass sheet being cut. The pin 52 will engage the lower ends of the slots 63, when there is no glass sheet beneath the cutter 65, thus holding the cutter out of engagement with the belt 13. Satisfactory results are obtainable by having the spring 66 under a tension of about ten pounds when the cutter 65 is engaging the glass sheet.

Arranged at the front of the bar 45 is a horizontal bar 67, which is rectangular in cross section, and the ends of this bar are rigidly secured to vertical posts 68 by pins 69 passing through openings in the ends of the bar and the posts 68 and held in place by set screws 70. The posts 68 are rigidly mounted upon the frame sides 10. Slidably mounted upon the bar 67 are carriages 71, adjustable longitudinally thereof and these carriages are clamped to the bar 67 in the selected adjusted position by plates 72 and set screws 73, which connect the plates with the carriages 71. Each carriage 71 has a horizontal extension or block 74, formed integral therewith and this block has a cylindrical vertical opening 75, slidably receiving a vertical shank 76 having a longitudinal groove 77, to receive a pin 78, so that the shank 76 cannot turn upon its longitudinal axis. Rigidly secured to the lower end of each shank 76 is a forked head 79, carrying a pressure roller 80 equipped with rubber tires. The forked head 79 is urged downwardly by a coil spring 81, surrounding the shank 76. The springs 81 are under a tension of about three pounds when the rollers 80 are pressed against the glass sheet, although this tension may be varied.

Arranged in the rear of the bar 45 are transverse pairs of posts 82 and 83, rigidly mounted upon the frame sides 10. The posts 82 and 83 in the different pairs are connected by horizontal longitudinal rods 84, rigidly secured thereto. A horizontal transverse bar 85 is provided, having openings in its ends for slidably receiving the rods 84 so that the bar may be adjusted longitudinally of these rods. The bar 85 is clamped to the rods 84 in the selected position by set screws 86. The bar 85 is rectangular in cross section and corresponds in shape to the bar 67 and carriages 87 are mounted upon the bar 85, corresponding to the carriages 71. These carriages are adjustable longitudinally of the bar 85 and are clamped thereto by plates 88 and screws 89. Each carriage 87 has a horizontal extension or block 90 rigidly secured thereto having a cylindrical vertical opening to receive a vertical shank 91 having a longitudinal groove 92 to receive a pin 93 which holds the shank 91 against turning upon its longitudinal axis. At its lower end, each shank 91 has a forked head 94 rigidly secured thereby carrying a roller 95, equipped with a rubber tire. Surrounding the shank 91 is a compressible coil spring 96, engaging the head 94, and forcing the roller downwardly into engagement with the glass. The roller 95 corresponds to the roller 80 and the spring 96 may be under a tension of about three pounds when the roller is engaging the glass. The rollers 95 may be adjusted longitudinally of the bar 85 to bring them in longitudinal alignment with the rollers 80. The rollers 80 in the transverse pair, and the rollers 95 in the transverse pair, may be adjusted transversely of the endless belt and the glass sheet carried thereon, depending upon the desired locations of the pressure to be applied to the glass sheet. The glass sheet G passes beneath the rollers 80 and is held thereby, prior to and during the cutting action of the rotary cutter 65. The glass sheet G also passes beneath the rollers 95 while the glass sheet is passing beneath the rotary cutter and after such passage. It is thus seen that the glass G is held by the rollers 80 prior to the beginning of the cutting action and during a portion of the cutting action. When the glass G sheet first passes beneath the rollers 95 it is still beneath the rollers 80 and is then held by both sets of rollers 80 and 95 during the cutting action. After the glass sheet passes the rollers 80, the rollers 95 will hold the glass sheet during the remainder of the cutting operation. It is thus seen that at least one set of rollers is holding the glass sheet during the cutting operation and forcing or pressing the glass sheet against the endless belt 13. The rollers 95 are adjustable longitudinally of the rods 84 so that they will engage the glass before the glass passes from beneath the rollers 80.

The numeral 97 designates a second horizontal transverse rear bar which is rectangular in cross section. This bar has openings 98 in its ends for slidably receiving the rods 84 and clamped to these rods by set screws 99, or the like. Carriages 100 corresponding to the carriages 71 are provided and mounted upon the transverse bar 97. These carriages are clamped to the bar 97 by plates 101 and screws 102 which connect the plates with the carriages 100. The carriages 100 have horizontal extensions or blocks 103 provided with vertical cylindrical openings for receiving vertical shanks 104. These shanks have longitudinal grooves 105 to receive pins 107 so that the shanks 104 cannot turn upon their longitudinal axes. Each shank 104 has a forked head 108 rigidly secured to its lower end and this head carries an upper breaking roller 109, equipped with a rubber tire. Surrounding each shank 104 is a compressible coil spring 110 which forces the roller 109 downwardly in engagement with the glass sheet. The spring 110 is under a tension of about three pounds when the glass sheet passes beneath the roller 109 although this pressure may vary. The upper breaking rollers 109 coact with the lower breaking rollers 36 and are ordinarily adjusted so that they will be in longitudinal alignment with the rollers 95 and 80. The breaking rollers 109 are arranged above and in vertical alignment with the transverse slot 35 and are positioned upon opposite sides of the lower breaking roller 36 and are preferably equidistantly spaced from the same and the line of cutting. The lower breaking roller 36 is in longitudinal alignment with the rotary cutter 65 so that the high portion 36' of the breaking roller 36 will have its longitudinal center in alignment with the cutting edge of the rotary cutter 65 and with the line of cut. The upper breaking rollers 109 exert downward pressure upon the glass sheet G, upon opposite sides of the high part 36' of the breaking roller 36 and hence the glass sheet is broken at the line of cut.

The numeral 111 designates a stationary gauge or guide, in the form of a T-iron secured to the frame side 10 by brackets 112 or the like. A rotary brush 113 cleans belt 13.

The practice of the method and the operation of the machine in connection with the practice of the method is as follows:

The glass sheets G are placed upon the takeup end of the endless belt 13 in engagement with the gauge 111, and are longitudinally spaced upon the same, so that each glass sheet is cut or scored and broken separately and in succession. The leading end of each glass sheet first passes beneath the pairs of rollers 80 and then passes to the rear of the rollers 80 and is cut or scored by the cutting element 65 while being held firmly upon the endless belt. The leading end of the glass sheet next passes beneath the rollers 95 and this occurs before the trailing end of the glass sheet moves from beneath the rollers 80. The glass sheet is now held beneath the rollers 95 during the remainder of the cutting or scoring action and after the glass sheet is released by the rollers 80. The trailing end of the cut or scored glass plate passes from beneath the rollers 95 before the leading end of the cut glass sheet passes beneath the upper breaking rollers 109. As soon as the cut or scored glass sheet passes beneath the upper breaking rollers 109 and above the lower breaking rollers 36, the glass sheet is broken. When the pressure is applied to the leading end of the cut glass sheet, such glass sheet is instantly broken throughout its entire length. We have found that a strip of three-sixteenths ($\frac{3}{16}$) of an inch, or less, can be cut and instantly broken throughout its entire length. The accepted theory in the art is that the glass should be broken at the last point of cutting. I have discovered that more satisfactory results are obtainable by breaking the glass from the first point of cutting. By the use of my method and machine, the glass is broken by pressure applied to the first point of cutting which is the leading end of the traveling sheet of glass. This enables me to break one glass sheet while the next traveling glass sheet is being cut or scored, thus producing a continuous operation of the method and machine. Each glass sheet is cut and broken while the glass sheet is traveling in the same direction, without in any way disturbing the movement of the glass sheet. As previously stated, the construction of the endless belt is such that the glass sheet will not move or slip thereon when pressed against the same by the rollers. This renders the operation of the machine accurate.

It is to be understood that the form of my invention herewith shown and described is to be taken as a preferred example of the same, and that various changes in the size, shape, and arrangement of parts may be resorted to without departing from the spirit of my invention or the scope of the subjoined claims.

Having thus described my invention, what I claim is:

1. A continuous method of severing a glass sheet, comprising supporting the glass sheet and moving it forwardly, scoring the glass sheet from its leading end to its trailing end and thereby arranging the starting end of the score line at the leading end of the sheet, and after the completion of the score line applying to the leading end of the glass sheet at the starting end of the score line a yielding force free from a breaking impact and thereby applying a bending moment to the glass sheet along the score line to snap the glass sheet throughout its entire length.

2. A continuous method of severing a glass sheet, comprising yieldingly supporting the glass sheet and moving it forwardly, scoring the glass sheet during its forward movement from its leading end to its trailing end and thereby arranging the starting end of the score line at the leading end of the sheet, and after the completion of the score line continuing the forward movement of the glass sheet and applying to the leading end of the glass sheet at the starting end of the score line a yielding force free from a breaking impact and thereby applying a bending moment to the glass sheet along the score line to snap the glass throughout its entire length.

3. A continuous method of severing glass sheets, comprising supporting a plurality of glass sheets and moving them all forwardly in the same direction, scoring in succession each glass sheet during its forward movement from its leading end to its trailing end and thereby arranging the starting end of the score line at the leading end of the glass sheet, and after the completion of the score line upon each glass sheet applying in succession to the leading end of each glass sheet at the starting end of the score line a yielding force free from a breaking impact and thereby applying a bending moment to such glass sheet along the score line to snap the glass sheet throughout its entire length.

4. A continuous method of severing glass sheets, comprising supporting the glass sheets in a longitudinal group and moving the group forwardly, scoring each leading glass sheet in succession during its forward movement from its leading end to its trailing end and thereby arranging the starting end of the line of score at the leading end of the glass sheet, and after the completion of the score line upon the leading glass sheet applying to the leading end of the leading glass sheet at the starting end of the score line a continuous yielding force free from a breaking impact and thereby applying a bending moment to the glass sheet along the score line to snap the glass sheet throughout its entire length while the next succeeding glass sheet is being scored.

5. A machine for severing a glass sheet, comprising a traveling support for receiving the glass sheet thereon and moving it forwardly, a scoring element arranged in the path of travel of the glass sheet to score the same from its leading end to its trailing end and thereby arranging the starting end of the score line adjacent to the leading end of the glass sheet, and a yielding pressure device including a lower element to support the glass sheet, upper pressure means, and yielding means to move the upper pressure means downwardly, the upper pressure means being raised by engagement with the glass sheet, said yielding pressure device being arranged rearwardly of the scoring element and longitudinally spaced from the scoring element a suitable distance to engage with the leading end of the glass sheet only after the completion of the score line, said yielding device applying to the leading end of the glass sheet at the starting end of the score line a yielding force free from a breaking impact and thereby applying a bending moment to the glass sheet along the score line to snap the glass sheet throughout its entire length.

6. A machine for severing glass sheets in succession, comprising an endless traveling support to receive the sheets thereon in a longitudinal group, a scoring element arranged above the traveling support, the take-up end portion and discharge end portion of the traveling support upon opposite sides of the scoring element being sufficiently long for receiving a plurality of sheets, the scoring element being arranged to engage each leading sheet in succession to score such sheet from its leading end to its trailing end and thereby arranging the starting end of the score line at the leading end of the glass sheet, and a yielding pressure device arranged rearwardly of the scoring element and longitudinally spaced from the scoring element a suitable distance to engage with the leading end of the leading glass sheet only after the completion of the score line, said yielding device applying to the leading end of the glass sheet at the starting end of the score line a yielding force free from a breaking impact and thereby applying a bending moment to such glass sheet along the score line to snap the glass sheet throughout its entire length.

7. A machine for severing glass sheets, comprising an endless traveling support to receive the sheets thereon, a scoring element mounted near and above the support to engage with the glass sheets, a lower breaking roller disposed rearwardly of the scoring element and spaced longitudinally therefrom for a greater distance than the length of the glass sheet to be severed, upper pressure rollers arranged near and upon opposite sides of the breaking roller and in substantial transverse alignment therewith, springs to move the upper pressure rollers downwardly, and means to drive the endless traveling support so that its take-up end moves toward the scoring element, the arrangement being such that the scoring element scores each glass sheet from its leading end to its trailing end and thereby arranges the starting end of the score line at the leading end of the glass sheet and the spring pressed upper rollers engage the leading end of each glass sheet only after the completion of the score line and apply to such leading end at the starting end of the score line a yielding force free from a breaking impact and thereby apply a bending moment to the glass sheet along the score line to snap the glass sheet throughout its entire length.

8. A machine for severing glass sheets, comprising a support, an endless belt to receive the sheets thereon and being flexible upon its transverse and longitudinal axes, a scoring element mounted upon the support and mounted near and above the endless belt to engage with the glass sheets, a lower breaking roller disposed rearwardly of the scoring element and spaced longitudinally therefrom for a greater distance than the length of the glass sheet to be severed and arranged beneath the upper run of the endless belt to engage therewith, upper pressure rollers disposed above said upper run near and upon opposite sides of the breaking roller and spaced from the scoring element for a greater distance than the length of the glass sheet to be severed, springs to move the upper pressure rollers downwardly, and means to drive the endless belt so that its take-up end moves toward the scoring element, the arrangement being such that the scoring element scores each glass sheet from its leading end to its trailing end and thereby arranges the starting end of the score line at the leading end of the glass sheet and the spring pressed upper rollers engage the leading end of each glass sheet only after the completion of the score line and apply to such leading end at the starting end of the score line a yielding force free from a breaking impact and thereby apply a bending moment to the glass sheet along the score line to snap the glass sheet throughout its entire length.

9. A machine for severing glass sheets, comprising a support including a table top, an endless belt which is flexible upon its transverse and longitudinal axes and having an upper run traveling upon the table top, the upper run receiving the glass sheets, a scoring element mounted upon the support and mounted near and above the upper run to engage with the glass sheets, pressure means engaging the glass sheet during the scoring operation for holding the same in place, a lower breaking roller mounted upon the support rearwardly of the scoring element and beneath the upper run and projecting above the table top to engage the upper run and spaced longitudinally from the scoring element and pressure means for a greater distance than the length of the glass sheet to be severed, upper pressure rollers disposed above the upper run near and upon opposite sides of the breaking roller and spaced from the scoring element and pressure means for a greater distance than the length of the glass sheet to be severed, yielding means to move the upper pressure rollers downwardly, and means to drive the endless belt so that its take-up end moves toward the scoring element, the arrangement being such that the scoring element scores each glass sheet from its leading end to its trailing end and thereby arranges the starting end of the score line at the leading end of the glass sheet and the upper pressure rollers engage the leading end of each glass sheet only after the completion of the score line and apply to such leading end at the starting end of the score line a yielding force free from a breaking impact and thereby apply a bending moment to the glass sheet along the score line to snap the glass sheet throughout its entire length.

10. A machine for severing glass sheets, comprising a support including a table top, an endless belt which is flexible upon its transverse and longitudinal axes and having an upper run traveling upon the table top, the upper run receiving the glass sheets, a scoring element mounted upon the support and mounted near and above the upper run to engage with the glass sheets, pressure elements mounted upon the support to engage the glass sheet during the scoring operation and disposed upon the forward and rear sides of the scoring element, a lower breaking roller mounted upon the support rearwardly of the scoring element and beneath the upper run and projecting above the table top to engage the upper run and spaced longitudinally from the scoring element and the rear pressure elements for a greater distance than the length of the glass sheet to be severed, upper pressure rollers disposed above the upper run near and upon opposite sides of the breaking roller and in substantial transverse alignment with the breaking roller, yielding means to move the upper pressure rollers downwardly, and means to drive the endless belt so that its take-up end travels towards the scoring element, the arrangement being such that the scoring element scores each glass sheet from its leading end to its trailing end and thereby arranges the starting end of the score line at the leading end of the glass sheet and the upper pressure rollers engage the leading end of each glass sheet only after the completion of the score line and the release of the glass sheet by the rear pressure element and apply to such leading end at the starting end of the score line a yielding force free from a breaking impact and thereby apply a bending moment to the glass sheet along the score line to snap the glass sheet throughout its entire length.

11. A machine for severing glass sheets, comprising a support including a table top, a rubber endless belt which is flexible upon its transverse and longitudinal axes and having an upper run traveling upon the table top, the upper run receiving the glass sheets, the outer face of the endless belt being provided with relatively fine longitudinal ribs, a scoring element mounted upon the support and mounted near and above the upper run to engage with the glass sheets, pairs of pressure elements mounted upon the support to engage with the glass sheet during the scoring operation and disposed forwardly and rearwardly of the scoring element, the pressure elements in each pair being disposed upon opposite sides of the scoring element, a lower breaking roller mounted upon the support rearwardly of the scoring element and beneath the upper run and projecting above the table top to engage the upper run and spaced longitudinally from the scoring element and the rear pressure elements for a greater distance than the length of the glass sheet to be served, upper pressure rollers disposed above the upper run near and upon opposite sides of the breaking roller and in substantial transverse alignment with the breaking roller, yielding means to move the upper pressure rollers downwardly, and means to drive the endless belt so that its take-up end travels toward the scoring element, the arrangement being such that the scoring element scores each glass sheet from its leading end to its trailing end and thereby arranges the starting end of the score line at the leading end of the glass sheet and the upper pressure rollers engage the leading end of each glass sheet only after the completion of the score line and the release of the glass sheet by the rear pressure element and apply to such leading end at the starting end of the score line a yielding force free from a breaking impact and thereby applying a bending moment to the glass sheet along the score line to snap the sheet throughout its entire length.

JOHN DALLAS.

REFERENCES CITED

The following references are of record in the file of this patent:

UNITED STATES PATENTS

| Number | Name | Date |
| --- | --- | --- |
| 1,324,219 | Waterloo | Dec. 9, 1919 |
| 1,946,356 | Owen | Feb. 6, 1934 |
| 1,972,210 | Waldron | Sept. 4, 1934 |
| 1,996,387 | Owen | Apr. 2, 1935 |
| 2,150,391 | Morris | Mar. 14, 1939 |
| 2,158,900 | Goffaux | May 16, 1939 |